(12) United States Patent
Hsiung et al.

(10) Patent No.: US 11,134,054 B2
(45) Date of Patent: Sep. 28, 2021

(54) CLASSIFICATION OF A DOMAIN NAME

(71) Applicant: International Business Machines Corporation, Armonk, NY (US)

(72) Inventors: Wei-Hsiang Hsiung, Taipei (TW); Sheng-Tung Hsu, Taipei (TW); Chih-Wen Chao, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/674,256

(22) Filed: Nov. 5, 2019

(65) Prior Publication Data
US 2021/0136029 A1 May 6, 2021

(51) Int. Cl.
H04L 29/12 (2006.01)
G06F 16/953 (2019.01)
G06F 16/28 (2019.01)

(52) U.S. Cl.
CPC ........ *H04L 61/1511* (2013.01); *G06F 16/285* (2019.01); *G06F 16/953* (2019.01)

(58) Field of Classification Search
CPC ... H04L 61/1511; G06F 16/285; G06F 16/953
See application file for complete search history.

(56) References Cited

U.S. PATENT DOCUMENTS

| | | |
|---|---|---|
| 6,778,986 B1 | 8/2004 | Stern |
| 6,886,129 B1 | 4/2005 | Raghavan |
| 7,260,568 B2 | 8/2007 | Zhang |
| 7,769,749 B2 | 8/2010 | He |
| 8,190,611 B1 | 5/2012 | Nachenberg |
| 8,539,329 B2 | 9/2013 | Wilson |
| 8,589,231 B2 | 11/2013 | Yankov |
| 8,768,926 B2 | 7/2014 | Tengli |
| 9,256,692 B2 | 2/2016 | Rajaram |

(Continued)

FOREIGN PATENT DOCUMENTS

EP    1742177 A1    1/2007

OTHER PUBLICATIONS

"Total Number of Websites", printed from the Internet on Jul. 11, 2019, 16 pps., <http://www.internetlivestats.com/total-number-of-websites/>.

(Continued)

*Primary Examiner* — Backhean Tiv
*Assistant Examiner* — Joseph M Cousins
(74) *Attorney, Agent, or Firm* — Aaron N. Pontikos; Daniel R. Simek

(57) ABSTRACT

Aspects of the present invention disclose a method, computer program product, and system for domain name classification. The method includes one or more processors receiving a request for querying a first domain name. The method further includes one or more processors acquiring a first source internet protocol (IP) address and the first domain name from the request. In response to determining the first domain name is not classified, the method further includes one or more processors an access tendency of the first source IP address based on a plurality of classifications of a plurality of domain names queried by the first source IP address. The method further includes one or more processors estimating a first classification of the first domain name based on the access tendency of the first source IP address.

20 Claims, 6 Drawing Sheets

(56) References Cited

U.S. PATENT DOCUMENTS

| | | | |
|---|---|---|---|
| 9,892,189 B1 | 2/2018 | Brown | |
| 2005/0165757 A1 | 7/2005 | Broder | |
| 2014/0215628 A1* | 7/2014 | Yan | H04L 63/1441 726/25 |
| 2014/0330847 A1* | 11/2014 | Pieper | G06F 16/9535 707/749 |
| 2017/0041332 A1* | 2/2017 | Mahjoub | H04L 43/0876 |
| 2018/0137135 A1 | 5/2018 | Walton | |

OTHER PUBLICATIONS

Apostolopoulos, "How to Build a Machine Learning Industry Classifier a Multi-class Text Classification Approach", Moosend Engineering & Data Science, Aug. 2, 2017, 8 pps., <https://medium.com/moosend-engineering-data-science/how-to-build-a-machine-learning-industry-classifier-5d19156d692f>.

Mandal et al., "Supervised Learning Methods for Bangla Web Document Categorization", International Journal of Artificial Intelligence & Applications (IJAIA), vol. 5, No. 5, Sep. 2014, 13 pps., <https://arxiv.org/ftp/arxiv/papers/1410/1410.2045.pdf>.

Pierre, "Practical Issues for Automated Categorization of Web Sites", Metacode Technologies, Sep. 2000, 6 pps., <https://www.ics.forth.gr/isl/SemWeb/proceedings/session3-3/html_version/semanticweb.html>.

Woogue et al., "Automatic Web Page Categorization Using Machine Learning and Educational-Based Corpus", International Journal of Computer Theory and Engineering, vol. 9, No. 6, Dec. 2017, 6 pps., <http://www.ijcte.org/vol9/1180-IT026.pdf>.

Mell et al., "The NIST Definition of Cloud Computing", National Institute of Standards and Technology, U.S. Department of Commerce, NIST Special Publication 800-145, Sep. 2011, 7 pages.

\* cited by examiner

US 11,134,054 B2

CLASSIFICATION OF A DOMAIN NAME

BACKGROUND OF THE INVENTION

The present invention relates to domain name classification, and more specifically, to automatic domain name classification.

A Domain Name Server (DNS) is a web server used on the Internet for converting domain names to their corresponding internet protocol (IP) addresses. When a user enters a domain name in an application, the application will issue a command to an operation system. The operating system will be connected to the DNS to convert the domain name to its IP address. Then the application will be connected to the IP address to perform its corresponding operations.

SUMMARY

Aspects of the present invention disclose a method, computer program product, and system for domain name classification. The method includes one or more processors receiving a request for querying a first domain name. The method further includes one or more processors acquiring a first source internet protocol (IP) address and the first domain name from the request. In response to determining the first domain name is not classified, the method further includes one or more processors an access tendency of the first source IP address based on a plurality of classifications of a plurality of domain names queried by the first source IP address. The method further includes one or more processors estimating a first classification of the first domain name based on the access tendency of the first source IP address.

DETAILED DESCRIPTION

Figure 1:
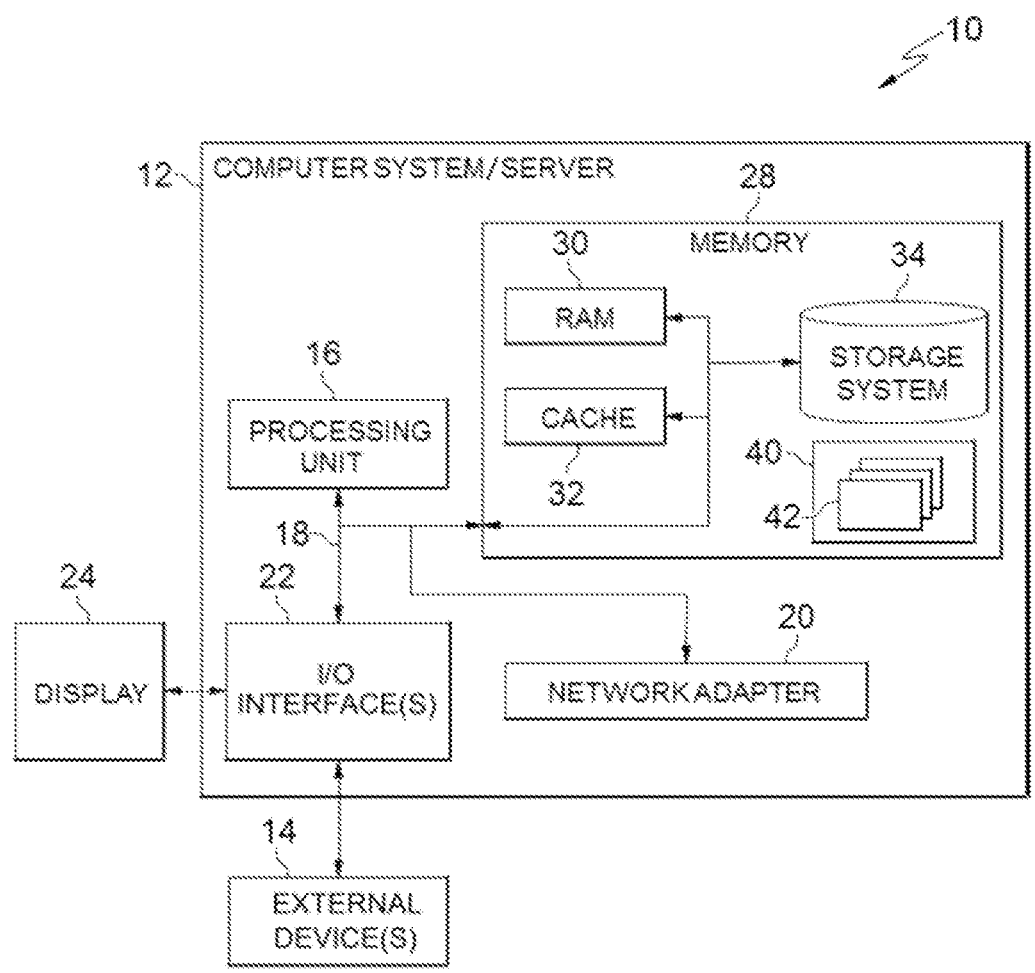
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Through the more detailed description of some embodiments of the present disclosure in the accompanying drawings, the above and other objects, features and advantages of the present disclosure will become more apparent, wherein the same reference generally refers to the same components in the embodiments of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
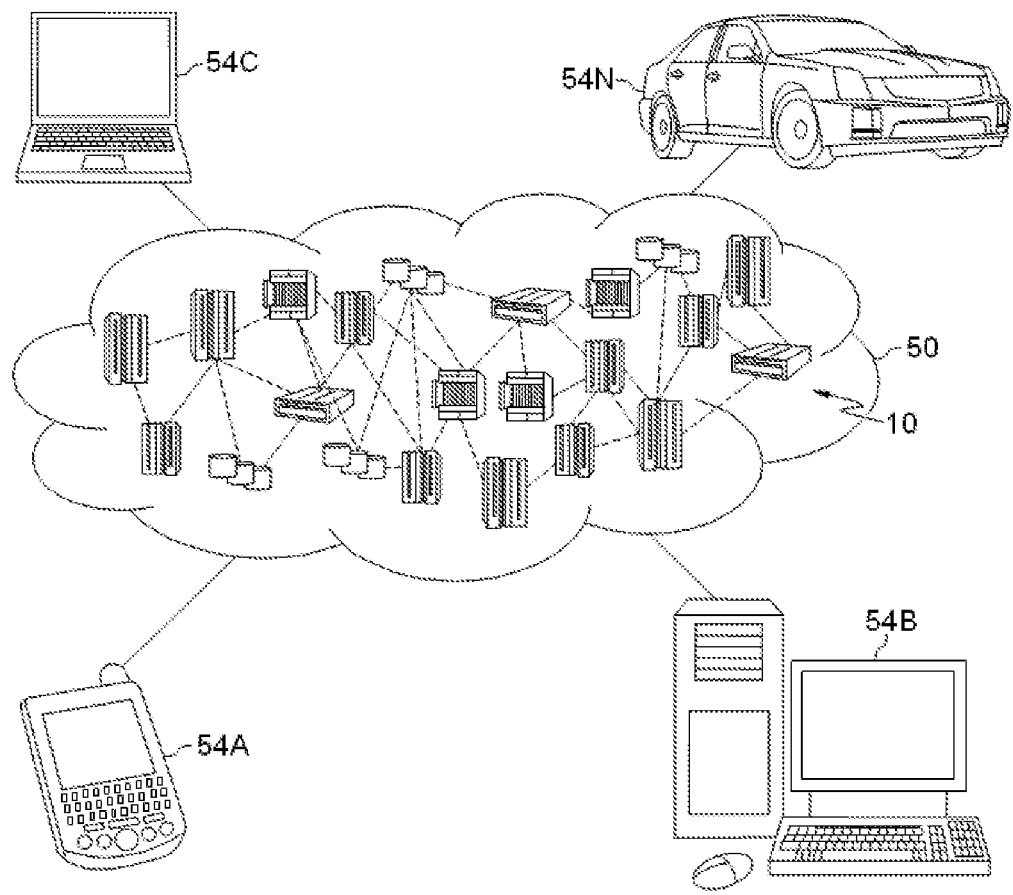
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
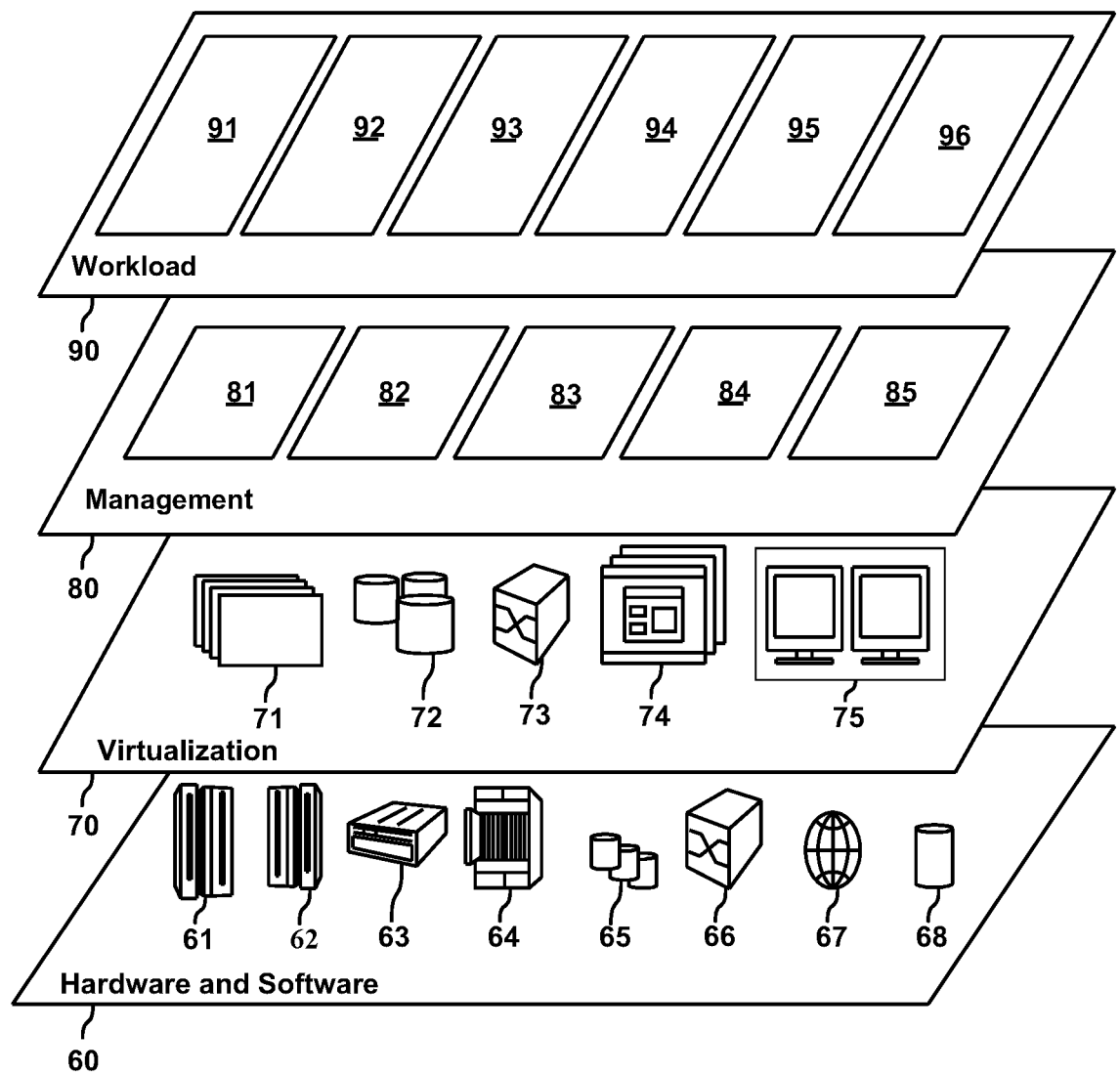
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and domain name classification 96.

Implementation of embodiments of the invention may take a variety of forms, and exemplary implementation details are discussed subsequently with reference to the Figures.

Embodiments of the present invention recognize that there are millions of domain names in the world and the quantity of new added domain names is continuously increasing every day. Some sources can provide classifications for top 100 or 1000 domain names, which is far from the ever-increasing requirements from users. Embodiments of the present invention recognize that manual classification requires each reviewer to classify a domain name by reading the content on the website, which is a time consuming and laborious job. Accordingly, embodiments of the present invention recognize the benefit of increasing the efficiency of domain name classification.

Embodiments of the present invention propose to classify a domain name by leveraging big data analysis. After receiving a request for an unknown domain name from a source internet protocol (IP) address, a Domain Name Server (DNS) can analyze an access tendency for the source IP address based on a large amount of classified history domain names queried by the source IP address. Herein, embodiments of the present invention can determine the access tendency for the source IP address based on a statistical distribution of the classifications of the history domain names. In addition, embodiments of the present invention can estimate the classification of the unknown domain name based on the access tendency.

Figure 4:
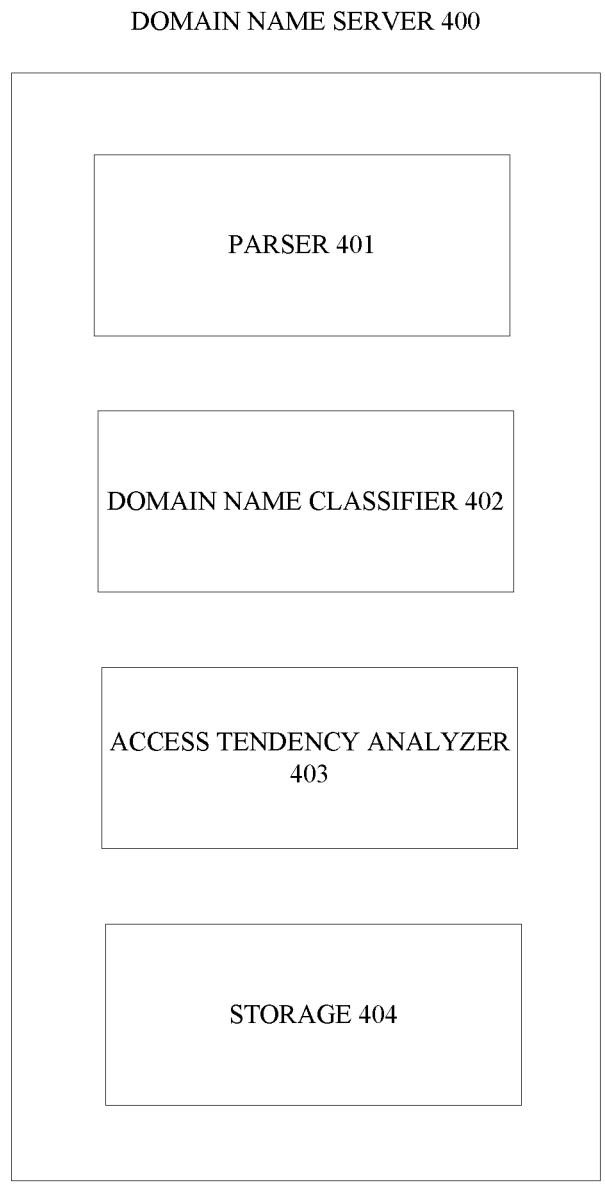
FIG. 4 depicts a domain name server (DNS) according to an embodiment of the present invention.

With reference now to FIG. 4, domain name server (DNS) 400 according to an embodiment of the present invention is depicted. DNS 400 includes parser 401, domain name classifier 402, access tendency analyzer 403, and storage 404. Parser 401 can provide the service of domain name resolution for transforming a domain name to its IP address. Domain name classifier 402 can implement domain name classification. Source IP analyzer 403 can analyze an access tendency of a source IP address. Classifications of domain names and the analysis results of source IP analyzer 403 are stored in storage 404. Various embodiments of present disclosure will be described by referring to DNS 400 in FIG. 4.

Figure 5:
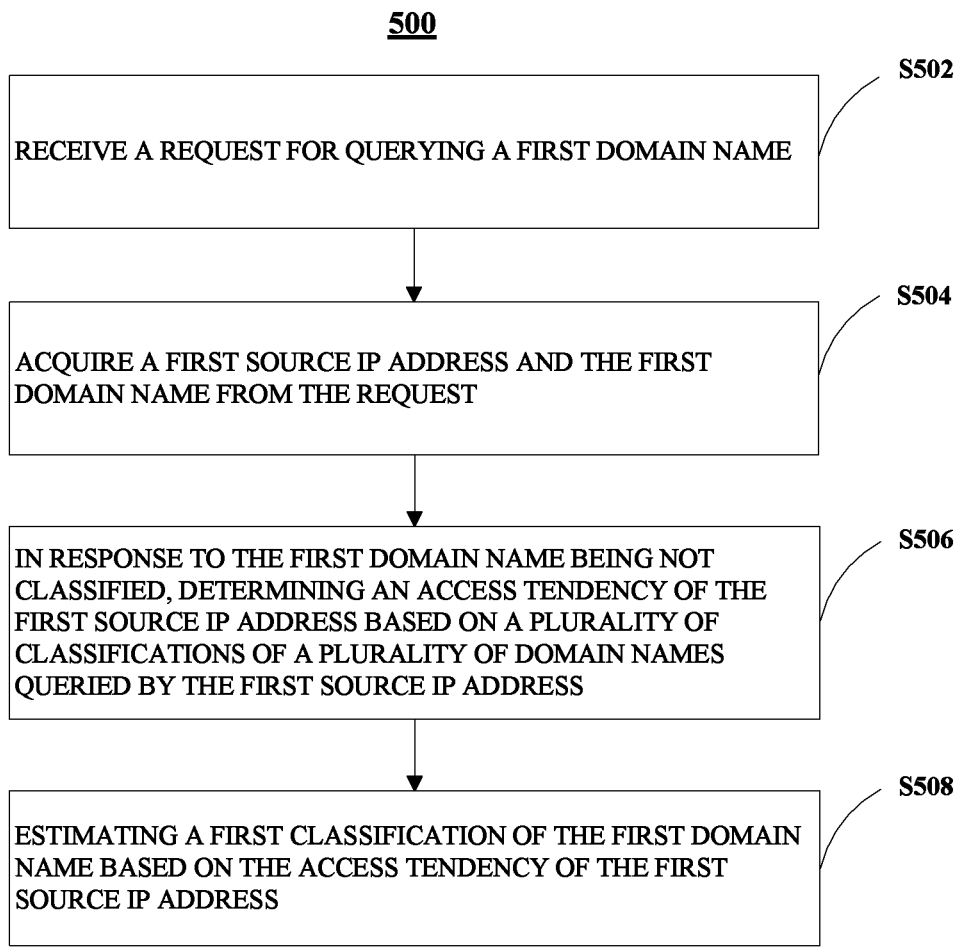
FIG. 5 depicts an example method for domain name classification according to an embodiment of the present invention.

FIG. 5 depicts an example method 500 for website classification, according to an embodiment of the present invention. In various embodiments of the present invention, DNS 400 can implement method 500 (comprising S502-S508).

At S502, DNS 400 receives a request for querying a first domain name. At S504, DNS 400 acquires the first domain name and a first source IP address from the request. At S506, in response to determining that the first domain name is not classified, DNS 400 determines an access tendency of the first source IP address based on a plurality of classifications of a plurality of domain names queried by the first source IP address. At S508, DNS 400 estimates a first classification of the domain name based on the access tendency of the first source IP address.

Figure 6:
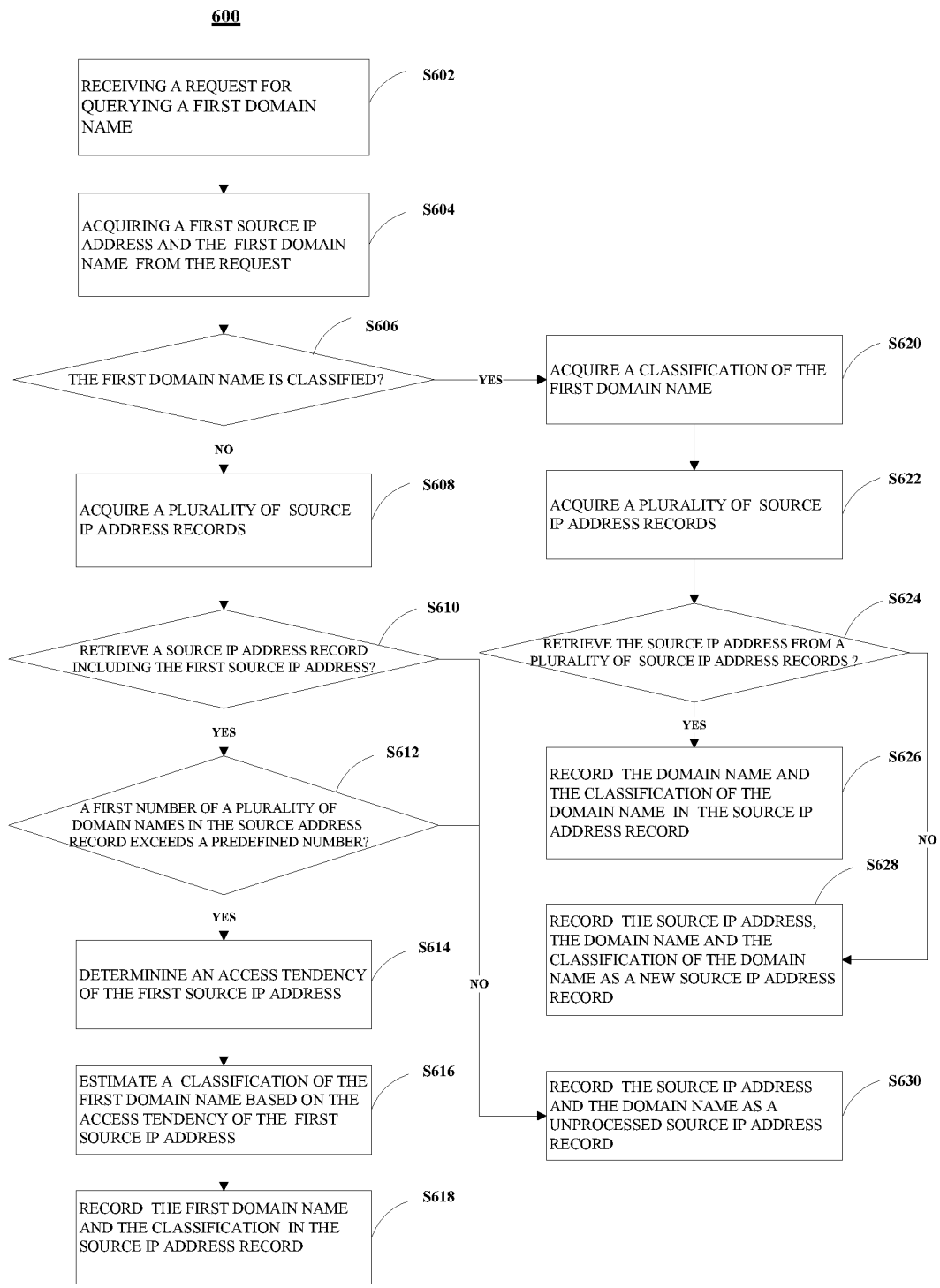
FIG. 6 depicts an example flow chart of process for domain name classification according to an embodiment of the present invention.

FIG. 6 depicts an example flow chart of process 600 for domain name classification, according to an embodiment of the present invention. In one embodiment, the example flow chart of process 600 can operate as a component of method 500 (previously discussed with regard to FIG. 5). In another embodiment, the example flow chart of process 600 can operate ad additional processing steps to method 500 (previously discussed with regard to FIG. 5)

In example embodiments, DNS 400 can operate S602 similarly to S502 (discussed previously with regard to FIG. 5). In S602, DNS 400 receives a request for querying a domain name. The request includes the domain name and a first source IP address initiating the request.

domain name, and at least one timestamp corresponding to the at least one domain name. According to one embodiment, a timestamp corresponding to a domain name can be representative of a date and time when the request is sent from the source IP address. In this case, DNS 400 can acquire the timestamp from the request. According to another embodiment, a timestamp corresponding to a domain name can be representative of a date and time when the request is received by DNS 400. In this case, DNS 400 can determine the timestamp. Table 2 shows an example of a plurality of source IP address records.

TABLE 2

| No. | Source IP addresses | Domain names | Classifications | Timestamp |
| --- | --- | --- | --- | --- |
| 1 | 166.111.2.0 | www.example4.com, | Sports | 2016-05-06 09:35:40 |
|  |  | www.example5.com, | Music | 2015-08-06 12:01:04 |
|  |  | . . . |  |  |
| 2 | 45.212.4.6 | www.example6.com | Technology | 2018-03-06 14:15:24 |
|  |  | www.example7.com | Finance | 2018-07-30 11:10:20 |
| . . . | . . . | . . . | . . . |  |

In example embodiments, DNS 400 can operate S604 similarly to S504 (discussed previously with regard to FIG. 5). In S604, DNS 400 acquires the domain name and the first source IP address from the request.

At S606, DNS 400 determines whether the domain name has been classified. DNS 400 can derive information of domain name classification from various sources. For example, classification information of some domain names for popular websites is available in some websites. Therefore, DNS 400 can acquire the classification information of some known domain names from various sources.

According to an example embodiment, DNS 400 can save the classification information of known domain names into storage 404, in form of a file or a data structure. Table 1 depicts an example classification information of known domain names. Table 1 includes a plurality of classification records. In the depicted example embodiment, each classification record includes a domain name and a classification of the domain name.

TABLE 1

| No. | Domain names | Classifications |
| --- | --- | --- |
| 1 | www.example1.com | Travel |
| 2 | www.example2.com | Technology |
| 3 | www.example3.com | Music |
| . . . | . . . | . . . |

According to one embodiment, DNS 400 can perform a search for the first domain in a plurality of classification records, saved in storage 404 such as Table 1. If DNS 400 can find the domain name in the plurality of classification records, then DNS has identified an indication that that the domain name has been classified. At S620, DNS 400 can acquire a classification of the first domain name from a classification record including the first domain name.

At S622, DNS 400 can acquire a plurality of source IP address records. In example embodiments, each of the plurality of source IP address records includes a source IP address, at least one domain name queried by the source IP addresses, at least one classification of the at least one For example, the domain names queried by the source IP address "166.111.2.0" include "www.example4.com", "www.example5.com" and so on. The classification of the domain name "www.example4.com" is "sports." The timestamp corresponding to the domain name "www.example4.com" is "2016-05-06 09:35:40." The classification of the domain name "www.example5.com" is "music." The timestamp corresponding to the domain name "www.example5.com" is "2015-08-06 12:01:04." In example embodiments, DNS 400 can save the source IP address records into storage 404 in form of data structure or a file. In additional embodiments, DNS 400 can acquire the plurality of source IP address records from storage 404.

At S624, DNS 400 determines whether the first source IP address can be retrieved from the plurality of source IP address records. If DNS 400 can find the first source IP address from the plurality of source IP address records, then DNS 400 identifies an indication that a source IP address record including the first source IP address can be retrieved from the plurality of source IP address records.

After retrieving the source IP address record including the first source IP address, DNS 400 (at S626) adds the first domain name, the classification of the first domain name, and a timestamp corresponding to the first domain name in a source IP address record of the source IP address.

If DNS 400 cannot find the acquired source IP address from a plurality of source IP address records, then DNS 400 does not identify an indication of a source IP address record including the first source IP address. Further, DNS 400 (at S628) records a new source IP address record, which includes the first source IP address, the first domain name, the classification of the first domain name, and a timestamp corresponding to the first domain name.

In an example embodiment, DNS 400 receives a request querying a domain name "www.example2.com" from the source IP address "45.212.4.6." DNS 400 can acquire domain name "www.example2.com" and the source IP address "45.212.4.6" from the request. Since "www.example2.com" can be retrieved in the plurality of classification records in Table 1, then "www.example2.com" has been classified. The classification of "www.example2.com" is "Technology." Furthermore, the source IP address "45.212.4.6" can be retrieved from the source IP addresses in Table 2, which indicates that a source IP address record including the source IP address "45.212.4.6" exists in Table 2.

DNS 400 can determine that a timestamp when the request is received is "2018-03-15 13:30:02." Accordingly, DNS 400 can add the domain name "www.example2.com" and the corresponding classification of "Technology," as well as the timestamp "2018-03-15 13:30:02," to the record of the source IP address "45.212.4.6" in Table 3.

In another example embodiment, DNS 400 receives a request querying a domain name "www.example13.com" from the source IP address "1.206.46.6." DNS 400 can acquire the domain name "www.example13.com" and the source IP address "1.206.46.6" from the request. In this example embodiment, DNS 400 finds that the domain name "www.example13.com" is classified to be "Travel" in Table 1. While DNS 400 cannot retrieve the source IP address "1.206.46.6" in Table 2. Accordingly, DNS 400 records the source IP address "1.206.46.6," the domain name "www.example13.com," the classification "Travel" and a timestamp "2019-01-06 15:23:05" as a new source IP address record in Table 3.

source IP address based on the plurality of classifications of the plurality of domain names queried by the first source IP address. In various embodiments of the present invention, DNS 400 can utilize access tendency analyzer 403 to implement S614.

According to one embodiment, as for a source IP address record, if a first number of one portion of the plurality of domain names corresponding to a second classification in a period of time is larger than those of other portions of the plurality of domain names corresponding to other classifications, then DNS 400 can determine the access tendency of the first source IP address based on a second classification. In an example embodiment, as for the source IP address record including "166.111.2.0," a total number of domain names can be a quantity of one-thousand from Year 2013 to Year 2018, in which music related domain names accounts for seven-hundred, sports related domain names account for two-hundred, and security related domain names account for one-hundred.

DNS 400 can determine the statistical distribution of the classifications of one-thousand domain names. That is, 70% of classifications are music, 20% of classifications are sports and 10% of classifications are security. Therefore, DNS 400 can determine that most of the requests from the source IP

TABLE 3

| No. | Source IP addresses | Domain names | Classifications | Timestamp |
|---|---|---|---|---|
| 1 | 166.111.2.0 | www.example4.com, | Sports | 2016-05-06 09:35:40 |
|   |   | www.example5com, | Music | 2015-08-06 12:01:04 |
|   |   | . . . |   |   |
| 2 | 45.212.4.6 | www.example6.com | Technology | 2018-03-06 14:15:24 |
|   |   | www.example7.com | Finance | 2018-07-30 11:10:20 |
|   |   | www.example2.com | Technology | 2018-03-15 13:30:02 |
|   |   | . . . | . . . |   |
| 3 | 1.206.46.6 | www.example13.com | Travel | 2019-01-06 15:23:05 |

At S606, if DNS 400 cannot find the domain name in the plurality of classification records, then DNS 400 does not identify an indication that the domain name has been classified (i.e., the domain name has not been classified). Then at S608, DNS 400 acquires a plurality of source IP address records. In various embodiments of the present invention, DNS 400 can perform operations of S608 similarly to S622, which described in further detail above.

At S610, DNS 400 determines whether the first source IP address can be retrieved from a plurality of source IP address records. If the determination result of S610 is "No," then at S630, DNS 400 records an unprocessed source IP address record including the first source IP address, the first domain name, as well as a timestamp in storage 404. In an example scenario, if at this time, the first domain name cannot obtain an estimated classification in view of current information, then the unprocessed source IP address record will be further processed in the future.

If the determination result of S610 is "Yes," then at S612, DNS 400 determines whether a first number of the plurality of domain names queried by the first source IP address exceeds a predefined number (e.g., one thousand). If the determination result of S612 is "No," then the process goes to S630. If the determination result of S612 is "Yes," then at S614, DNS 400 determines an access tendency of the first address "166.111.2.0" are related to music related domain names. Accordingly, DNS 400 can determine an access tendency of the source IP address "166.111.2.0 to be "Music."

According to another embodiment, as for a source IP address record, if a first querying frequency of one portion of the plurality of domain names corresponding to a third classification in a period of time is higher than those of other portions of the plurality of domain names corresponding to other classifications, DNS 400 can determine an access tendency of the first source IP address based on a third classification. In an example embodiment, as for the source IP address record including "45.212.4.6," DNS 400 can assume that a total number of domain names is a quantity of one-thousand from Year 2017 to Year 2018, in which technology related domain names accounts for eight-hundred and music related domain names account for two-hundred. A querying frequency of technology related domain names is 0.8. A querying frequency of music related domain names is 0.2.

DNS 400 can determine the statistical distribution of the classifications of one-thousand domain names. That is, 80% of classifications are technology, 20% of classifications are music. Therefore, DNS 400 can determine that most of the requests from the source IP address "45.212.4.6" are related to technology related domain names. Accordingly, an access tendency of the source IP address "45.212.4.6" can be determined to be "Technology." Further, DNS 400 can store the statistical distribution of the classification of one-thousand domain names and the access tendency of the source IP address "45.212.4.6" in storage 404.

According to one embodiment, DNS 400 can record the statistical distribution of the classifications of all domain names queried by a source IP address and the access tendency of the source IP address in storage 404, for example in Table 2.

At S616, DNS can estimate a first classification of the first domain name based on the access tendency of the first source IP address. For example, DNS 400 can utilize domain name classifier 402 to perform the implementation process of S616. In an example embodiment, DNS 400 receives a request querying a domain name "www.example24.com" from the source IP address "45.212.4.6." DNS 400 can determine that the domain name "www.example24.com" has not been classified because "www.example24.com" cannot be retrieved from domain names in Table 1. The source IP address "45.212.4.6" can be found in Table 3. According to above embodiments, the source IP address "45.212.4.6" has a tendency to access technology related domain name. Therefore, DNS 400 can estimate a classification of the domain name "www.example24.com" to be "Technology" based on the access tendency of the source IP address "45.212.4.6."

DNS 400 can add the domain name "www.example24.com" and a corresponding estimated classification "Technology" to Table 1. According to one embodiment, after some time, DNS 400 can receive a plurality of requests for querying the first domain name from a plurality of source IP addresses. To improve the accuracy of estimation, DNS 400 can repeat the process 600 for each request. Accordingly, a large number of estimation results for the first classification can be output.

For example, the first classification is associated with one-thousand estimation results. Of the one-thousand estimation results, six-hundred estimation results are "Music," three-hundred estimation results are "Technology" and one-hundred estimation results are "Travel." Utilizing big data analysis, DNS 400 can determine the first classification to be "Music". From the statistical point of view, "Music" is more accurate than "Technology."

In the practice, DNS 400 can adjust the first classification with the number of the source IP address records increasing. From a perspective of big data statistics, the first classification is more and more accurate (i.e., increasing accuracy). DNS 400 can add classification record including "www.example24.com" and "Technology" to Table 1. Accordingly, the classifications of domain names can be further expanded.

Embodiments of the present invention can implement automatic domain name classification without human participation. Therefore, large amount of time and human resources can be saved. Furthermore, if DNS 400 is provisioned within an enterprise, once a domain name is identified as an unsecured one, connection request with a danger website will be refused by DNS 400. Accordingly, the security of network connection can be ensured.

The records in Tables 1, 2, 3 are only for purposes of illustration but are not intended to be exhaustive or limited to the embodiments disclosed. Those in the art should understand that the records can also be saved in a form of a file or other data structures.

It should be noted that the computer-implemented method of domain name classification (or achieved by a computer-implemented system for domain name classification) according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for domain name classification, the method comprising:
   receiving, by one or more processors, a request for querying a first domain name;
   acquiring, by one or more processors, a first source internet protocol (IP) address and the first domain name from the request;
   in response to determining the first domain name is not classified, determining, by one or more processors, an access tendency of the first source IP address based on a plurality of classifications of a plurality of domain names queried by the first source IP address; and
   estimating, by one or more processors, a first classification of the first domain name based on the access tendency of the first source IP address.

2. The method of claim 1, wherein the determining an access tendency of the first source IP address further comprises:
   acquiring, by one or more processors, a plurality of source IP address records, wherein each respective instance of the plurality of source IP address records includes a corresponding source IP address, at least one domain name queried by the corresponding source IP addresses, at least one classification of the at least one domain name, and at least one timestamp corresponding to the at least one domain name;
   retrieving, by one or more processors, a source IP address record including the first source IP address from the plurality of source IP address records; and
   in response to determining that a first number of the plurality of domain names queried by the first source IP address exceeds a predefined number, determining, by one or more processors, the access tendency of the first source IP address based on the plurality of classifications of the plurality of domain names queried by the first source IP address.

3. The method of claim 1, wherein the determining the access tendency of the first source IP address further comprises:
   in response to determining that a first number of one portion of the plurality of domain names corresponding to a second classification of the plurality of classifications in a period of time is larger than respective other portions of the plurality of domain names corresponding to other classifications of the plurality of classifications, determining, by one or more processors, the access tendency of the first source IP address based on a second classification.

4. The method of claim 1, wherein the determining the access tendency of the first source IP address further comprises:
   in response to determining that a first querying frequency of one portion of the plurality of domain names corresponding to a third classification of the plurality of classifications in a period of time is higher than respective other portions of the plurality of domain names corresponding to other classifications of the plurality of classifications, determining, by one or more processors, the access tendency of the first source IP address based on a third classification.

5. The method of claim 1, further comprising:

in response to determining that the first domain name is classified, acquiring, by one or more processors, a fourth classification of the first domain name;

acquiring, by one or more processors, a plurality of source IP address records, wherein each respective instance of the plurality of source IP address records includes a corresponding source IP address, at least one domain name queried by the corresponding source IP addresses, at least one classification of the at least one domain name, and at least one timestamp corresponding to the at least one domain name; and in response to determining that a source IP address record including the first source IP address is retrieved from the plurality of source IP address records, recording, by one or more processors, the first domain name, the fourth classification and a timestamp corresponding to the first domain name in the source IP address record.

6. The method of claim 5, further comprising:

in response to determining that the first source IP address is not retrieved from the plurality of source IP address records, recording, by one or more processors, a new source IP address record including the first source IP address, the first domain name, the fourth classification and a timestamp corresponding to the first domain name.

7. The method of claim 2, further comprising:

recording, by one or more processors, the first domain name and the first classification in the source IP address record.

8. A computer program product for domain name classification, the computer program product comprising:

one or more computer readable storage media and program instructions stored on the one or more computer readable storage media, the program instructions comprising:

program instructions to receive a request for querying a first domain name;

program instructions to acquire a first source internet protocol (IP) address and the first domain name from the request;

in response to determining the first domain name is not classified, program instructions to determine an access tendency of the first source IP address based on a plurality of classifications of a plurality of domain names queried by the first source IP address; and program instructions to estimate a first classification of the first domain name based on the access tendency of the first source IP address.

9. The computer program product of claim 8, wherein the program instructions to determine an access tendency of the first source IP address further comprise program instructions to:

acquire a plurality of source IP address records, wherein each respective instance of the plurality of source IP address records includes a corresponding source IP address, at least one domain name queried by the corresponding source IP addresses, at least one classification of the at least one domain name, and at least one timestamp corresponding to the at least one domain name;

retrieve a source IP address record including the first source IP address from the plurality of source IP address records; and in response to determining that a first number of the plurality of domain names queried by the first source IP address exceeds a predefined number, determine the access tendency of the first source IP address based on the plurality of classifications of the plurality of domain names queried by the first source IP address.

10. The computer program product of claim 8, wherein the program instructions to determine an access tendency of the first source IP address further comprise program instructions to:

in response to determining that a first number of one portion of the plurality of domain names corresponding to a second classification of the plurality of classifications in a period of time is larger than respective other portions of the plurality of domain names corresponding to other classifications of the plurality of classifications, determine the access tendency of the first source IP address based on a second classification.

11. The computer program product of claim 8, wherein the program instructions to determine an access tendency of the first source IP address further comprise program instructions to:

in response to determining that a first querying frequency of one portion of the plurality of domain names corresponding to a third classification of the plurality of classifications in a period of time is higher than respective other portions of the plurality of domain names corresponding to other classifications of the plurality of classifications, determine the access tendency of the first source IP address based on a third classification.

12. The computer program product of claim 8, further comprising program instructions, stored on the one or more computer readable storage media, to:

in response to determining that the first domain name is classified, acquire a fourth classification of the first domain name;

acquire a plurality of source IP address records, wherein each respective instance of the plurality of source IP address records includes a corresponding source IP address, at least one domain name queried by the corresponding source IP addresses, at least one classification of the at least one domain name, and at least one timestamp corresponding to the at least one domain name; and in response to determining that a source IP address record including the first source IP address is retrieved from the plurality of source IP address records, record the first domain name, the fourth classification and a timestamp corresponding to the first domain name in the source IP address record.

13. The computer program product of claim 12, further comprising program instructions, stored on the one or more computer readable storage media, to:

in response to determining that the first source IP address is not retrieved from the plurality of source IP address records, record a new source IP address record including the first source IP address, the first domain name, the fourth classification and a timestamp corresponding to the first domain name.

14. The computer program product of claim 9, further comprising program instructions, stored on the one or more computer readable storage media, to:

record the first domain name and the first classification in the source IP address record.

15. A computer system for domain name classification, the computer system comprising:
- one or more computer processors;
- one or more computer readable storage media; and
- program instructions stored on the computer readable storage media for execution by at least one of the one or more processors, the program instructions comprising:
- program instructions to receive a request for querying a first domain name;
- program instructions to acquire a first source internet protocol (IP) address and the first domain name from the request;
- in response to determining the first domain name is not classified, program instructions to determine an access tendency of the first source IP address based on a plurality of classifications of a plurality of domain names queried by the first source IP address; and
- program instructions to estimate a first classification of the first domain name based on the access tendency of the first source IP address.

16. The computer system of claim 15, wherein the program instructions to determine an access tendency of the first source IP address further comprise program instructions to:
- acquire a plurality of source IP address records, wherein each respective instance of the plurality of source IP address records includes a corresponding source IP address, at least one domain name queried by the corresponding source IP addresses, at least one classification of the at least one domain name, and at least one timestamp corresponding to the at least one domain name;
- retrieve a source IP address record including the first source IP address from the plurality of source IP address records; and
- in response to determining that a first number of the plurality of domain names queried by the first source IP address exceeds a predefined number, determine the access tendency of the first source IP address based on the plurality of classifications of the plurality of domain names queried by the first source IP address.

17. The computer system of claim 15, wherein the program instructions to determine an access tendency of the first source IP address further comprise program instructions to:
- in response to determining that a first number of one portion of the plurality of domain names corresponding to a second classification of the plurality of classifications in a period of time is larger than respective other portions of the plurality of domain names corresponding to other classifications of the plurality of classifications, determine the access tendency of the first source IP address based on a second classification.

18. The computer system of claim 15, wherein the program instructions to determine an access tendency of the first source IP address further comprise program instructions to:
- in response to determining that a first querying frequency of one portion of the plurality of domain names corresponding to a third classification of the plurality of classifications in a period of time is higher than respective other portions of the plurality of domain names corresponding to other classifications of the plurality of classifications, determine the access tendency of the first source IP address based on a third classification.

19. The computer system of claim 15, further comprising program instructions, stored on the one or more computer readable storage media, to:
- in response to determining that the first domain name is classified, acquire a fourth classification of the first domain name;
- acquire a plurality of source IP address records, wherein each respective instance of the plurality of source IP address records includes a corresponding source IP address, at least one domain name queried by the corresponding source IP addresses, at least one classification of the at least one domain name, and at least one timestamp corresponding to the at least one domain name; and
- in response to determining that a source IP address record including the first source IP address is retrieved from the plurality of source IP address records, record the first domain name, the fourth classification and a timestamp corresponding to the first domain name in the source IP address record.

20. The computer system of claim 16, further comprising program instructions, stored on the computer readable storage media for execution by at least one of the one or more processors, to:
- record the first domain name and the first classification in the source IP address record.

* * * * *